United States Patent
Urbach

(10) Patent No.: US 7,261,487 B2
(45) Date of Patent: Aug. 28, 2007

(54) COMPOSITE BALL JOINT BEARING FOR A BALL JOINT ASSEMBLY

(75) Inventor: Brian A. Urbach, Rochester Hills, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 301 days.

(21) Appl. No.: 10/631,477

(22) Filed: Jul. 31, 2003

(65) Prior Publication Data

US 2005/0024992 A1    Feb. 3, 2005

(51) Int. Cl.
*F16C 11/06* (2006.01)
(52) U.S. Cl. .................. 403/114; 403/120; 403/145; 403/148; 403/DIG. 1
(58) Field of Classification Search ........... 403/114, 403/120, 122, 135, 145, 148, DIG. 1, 90; 280/93.511; 384/446, 535, 536; 464/29
See application file for complete search history.

(56) References Cited

U.S. PATENT DOCUMENTS

| | | | |
|---|---|---|---|
| 4,986,689 A | * | 1/1991 | Drutchas ............. 403/127 |
| 5,066,159 A | | 11/1991 | Urbach |
| 5,380,114 A | | 1/1995 | Urbach |
| 5,678,947 A | | 10/1997 | Urbach |
| 5,931,597 A | | 8/1999 | Urbach |
| 6,042,294 A | | 3/2000 | Urbach |
| 6,611,185 B2 | * | 8/2003 | Carlson et al. ........ 403/DIG. 1 |

FOREIGN PATENT DOCUMENTS

WO    WO 03/008820 A1 *   1/2003   ............. 403/135

* cited by examiner

*Primary Examiner*—Daniel P. Stodola
*Assistant Examiner*—Michael P. Ferguson
(74) *Attorney, Agent, or Firm*—MacMillan, Sobanski & Todd, LLC

(57) ABSTRACT

A ball joint assembly includes a housing (12) defining a socket chamber (18) and having an opening (32); a composite ball joint bearing (20) disposed within the socket chamber; a ball stud (24) supported by the composite ball joint bearing and having a shank portion (30) which projects through the opening of the housing; and a seal assembly (40) adapted to seal the opening between the ball stud and the socket chamber. The composite ball joint bearing is formed from a first plastic material (20A) and a second magnetostrictive alloy material (20B) which is adapted to change its shape when in the presence of a magnetic field to thereby change the rotational and oscillation properties of the ball joint assembly.

18 Claims, 3 Drawing Sheets

COMPOSITE BALL JOINT BEARING FOR A BALL JOINT ASSEMBLY

BACKGROUND OF THE INVENTION

This invention relates in general to a ball joint assembly for use in a vehicle suspension system and in particular to an improved composite ball joint bearing for use with such a ball joint assembly.

A ball joint assembly provides an articulated connection between two relatively movable parts. A ball joint assembly is commonly used in motor vehicle steering systems and in motor vehicle suspension systems. Typically, a ball joint assembly for a motor vehicle suspension system includes a ball stud with a spherical ball end and a housing or socket member with a spherical socket. A ball joint bearing member disposed in the housing receives the ball end and supports the ball end for pivotal and rotational movement.

SUMMARY OF THE INVENTION

This invention relates to a ball joint assembly adapted for use in a motor vehicle suspension system. The ball joint assembly includes a housing defining socket chamber and having an opening; a composite ball joint bearing disposed within the socket chamber, a ball stud supported by the composite ball joint bearing and having a shank portion which projects through the opening of the housing; and a seal assembly adapted to seal the opening between the ball stud and the socket chamber. According to the present invention, the composite ball joint bearing is formed from a first plastic material and a second magnetostrictive alloy material which is adapted to change its shape when in the presence of a magnetic field to thereby change the rotational and oscillation properties of the ball joint assembly.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
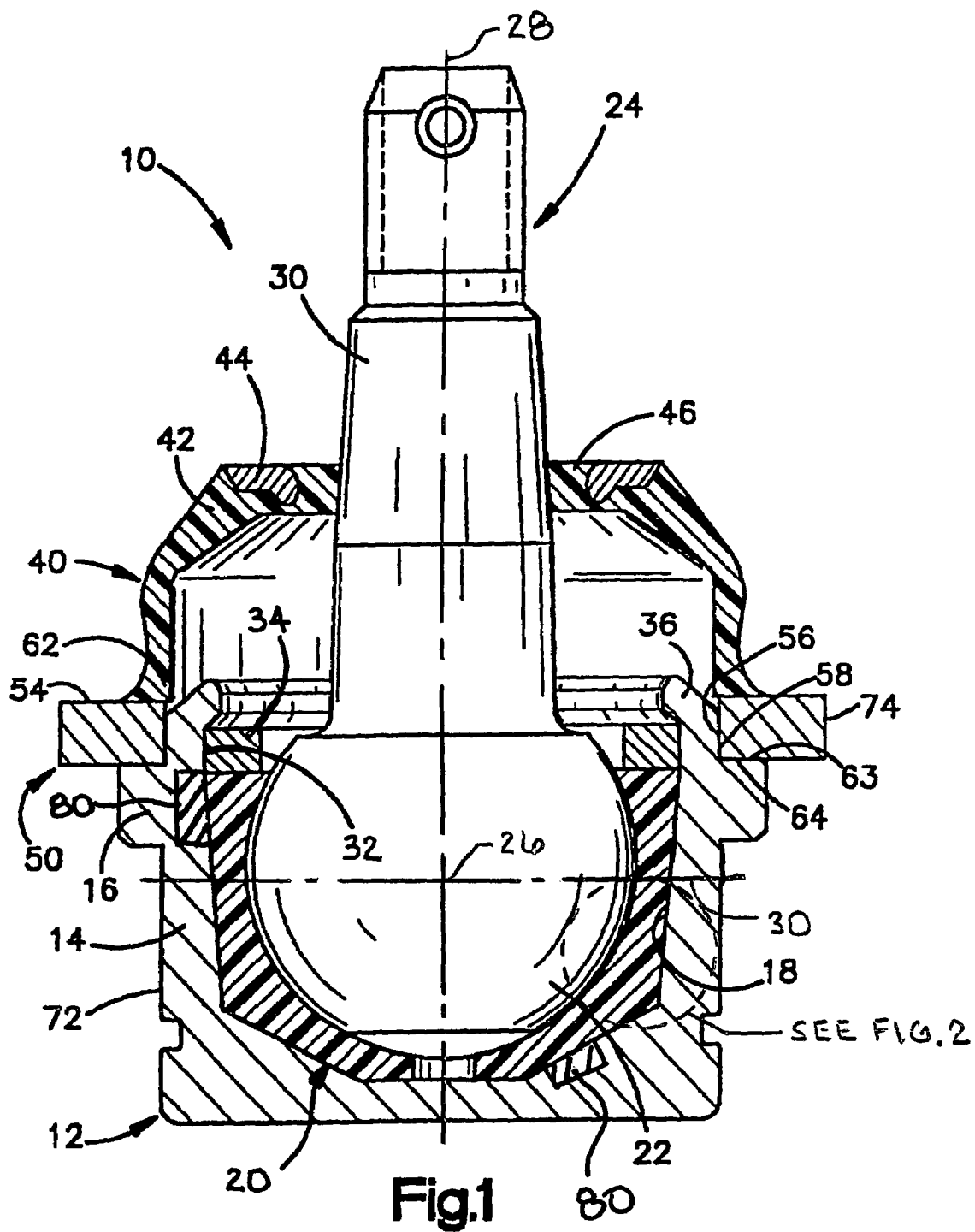
FIG. 1 is a sectional view of a ball joint assembly including a first embodiment of a composite ball joint bearing in accordance with the present invention.

Referring now to FIG. 1, there is illustrated a ball joint assembly, indicated generally at 10, including a first embodiment of a composite ball joint bearing, indicated generally at 20, in accordance with the present invention. The general structure and operation of the ball joint assembly 10 is conventional in the art. Thus, only those portions of the ball joint assembly 10 which are necessary for a full understanding of this invention will be explained and illustrated in detail. Also, although this invention will be described and illustrated in connection with the particular ball joint assembly 10 disclosed herein, it will be appreciated that this invention may be used in connection with other types of ball joint assemblies. For example, the ball joint bearing 20 of the present invention can be used in conjunction with any of the ball joint assemblies shown in U.S. Pat. No. 5,066,159 to Urbach, U.S. Pat. No. 5,380,114 to Urbach, U.S. Pat. No. 5,678,947 to Urbach et al., U.S. Pat. No. 5,931,597 to Urbach, and U.S. Pat. No. 6,042,294 to Urbach, the disclosures of each of these patents incorporated herein by reference.

The illustrated ball joint assembly 10 includes a rigid metal housing or socket member 12 having a generally cylindrical side wall 14 and a mounting flange 16. The housing 12 defines a generally cylindrical socket chamber 18 within which is located the composite ball joint bearing 20. The housing 12 is made by a suitable process from a suitable material. For example, the housing 12 can be cold formed from SAE grade 1008 or 1010 steel or screw machined from SAE grade 1215 or 1018 steel.

The composite ball joint bearing 20, which will be described below in more detail, supports a spherical ball portion 22 of a ball stud 24. The composite ball joint bearing 20 supports the ball stud 24 for limited rotation and pivoting movement about a center of oscillation 26, which is the intersection of a longitudinal axis 28 and a transverse axis 30 of the ball stud 24. The center of oscillation 26 is coincident with the center of the spherical ball portion 22 of the ball stud 24. The ball stud 24 is made by a suitable process from a suitable material. For example, the ball stud 24 can be cold headed or screw machined and then carburized from SAE grade 8115 SM or 8615 steel.

The ball stud 24 includes a shank portion 30 which projects through a circular opening 32 formed in the upper (as viewed in FIG. 1) end portion of the housing 12. An annular metal ring 34 is held in the socket chamber 18 by a radially inturned circular flange portion 36 of the housing 12.

The ball joint 10 further includes a generally annular seal assembly 40. The seal assembly 40 is provided to seal the opening 32 between the ball stud 24 and the socket 12. In the illustrated embodiment, the seal assembly 40 includes a flexible wall portion 42 having an annular metal reinforcing ring 44 disposed therein by a suitable process, such as for example, by an insitu or injection molding process. The ring 44 holds an axially outer end portion 46 of the flexible wall 42 in sealing engagement with the shank portion 30 of the ball stud 24.

A rigid annular metal retainer ring 50 connects a lower portion of the flexible wall 42 with the housing 12. Thus, the flexible wall 42 is bonded to an axially outwardly facing flat annular side surface 54 of the retainer ring 50. A circular inner side surface 56 of the retainer ring 50 has an interference fit with and sealingly engages a cylindrical outer side surface 58 of the housing 12. The retainer ring 50 may be machined or cold formed from SAE grade 1008 or 1010 steel which is available from LTV Steel.

In the illustrated embodiment, the flexible wall 42 of the seal assembly 40 further includes an annular lower (as viewed in FIG. 1) end portion 62 which is bonded to the flat annular side surface 54 of the retainer ring 50. It is contemplated that the flexible wall 42 of the seal assembly 40 could be connected with the retainer ring 50 in a different manner if desired. For example, mechanical connection could be provided between the flexible wall 42 and the retainer ring 50. It is also contemplated that the retainer ring 50 could be at least partially enclosed by a thin layer of the polymeric material which forms the flexible wall 42. The seal assembly 40 is provided with a central opening or passage 48 through which the ball stud shank portion 32 extends.

The flexible wall portion 42 of the seal assembly 40 is preferably made of a suitable polymeric material, such as for example, Compound #1806-85A urethane available from Trostel. Alternatively, the flexible wall portion 42 of the seal assembly 40 can be made from other suitable materials. For example, the wall portion 42 can be made from an elastomeric material, such as Neoprene which is available from Dupont. Alternatively, the seal assembly 40 can have a different construction and/or can be formed from other suitable materials if so desired. The structure and operation of the ball joint assembly 10 thus far described is conventional in the art.

Figure 2:
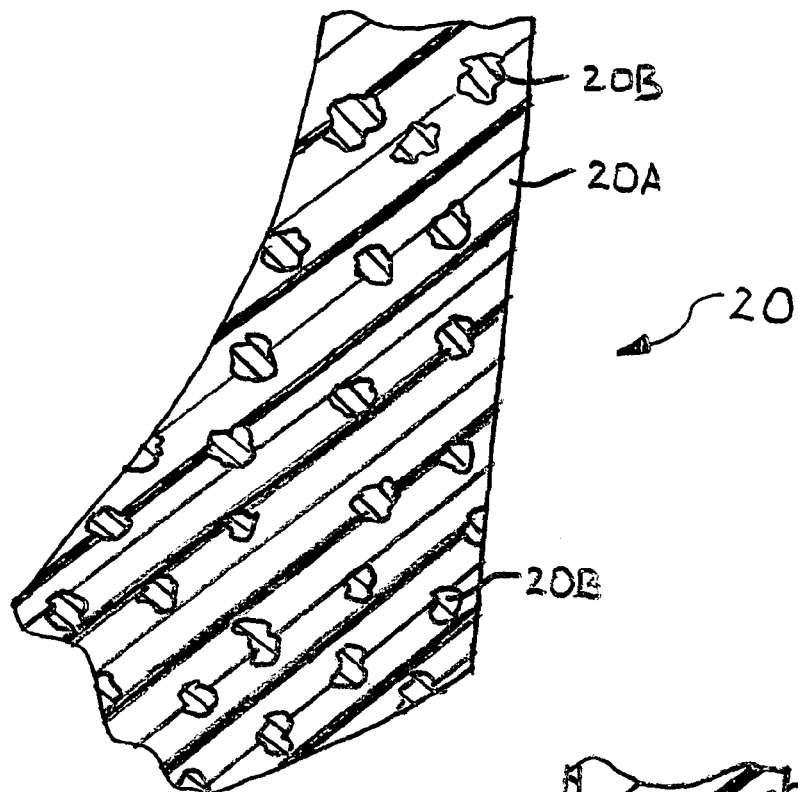
FIG. 2 is an enlarged sectional view of a portion of the first embodiment of the composite ball joint bearing illustrated in FIG. 1 in accordance with present invention.

Turning now to FIG. 2, there is illustrated a portion of the first embodiment of the composite ball joint bearing 20 in accordance with this invention. As shown therein, the composite ball joint bearing 20 is formed from a mixture or combination of a first material 20A and a second material 20B (the second material 20B only being shown in the enlarged portion of the composite ball joint bearing 20 shown in FIG. 2). In terms of the total weight of the bearing 20, the first material 20A is the primary material of the composite ball joint bearing 20 and is effective to define a main body portion of the 20 and the second material 20B is the secondary material of the ball joint bearing 20 and is added to the first material 20A for a purpose to be discussed below.

The first material 20A of the ball joint bearing 20 is made from a suitable material which preferably can be molded. For example, the first material 20A of the ball joint bearing 20 can be made of injection molded Delrin brand plastic which is available from E. I. DuPont de Nemours & Co. The second material 20B of the ball joint bearing 20 is made from a suitable magnetostrictive alloy material that changes its shape when in the presence of a magnetic field. An example such a suitable material is Terfenol-D® which is available from ETREMA Products, Inc., of Ames, Iowa. Alternatively, one or both of the first and second materials can be other than illustrated if so desired.

As shown in this embodiment, the composite ball joint bearing 20 is molded from a mixture consisting of the first material 20A and the second material 20B. To accomplish this, the second material 20B is preferably in a powder form and is added to the first material 20A and then formed into the bearing 20 by an insitu injected molding process. As shown in FIG. 2, this results in the bearing 20 having a generally uniform random distribution of the second material 20B therein. Alternatively, the second material 20B can be added to the first material 20A in a different form, such as in a non-powder or solid form. In either case, the amount of the second material 20B which is added to the first material 20A is selected according to desired characteristics, as will be discussed below. Thus, in terms of the total weight of the bearing 20, the first material 20A can be in the range from about 60% to about 90% and the second material 20B can be in the range from about 10% to about 40%. More preferably, the first material 20A is in the range from about 70% to about 90% and the second material 20B is in the range from about 10% to about 30%. Alternatively, the amount or percentage of the first material 20A and the second material 20B can be other than described if so desired.

As shown in FIG. 1, the ball joint assembly 10 further includes one or more electromagnets 80 which are in close proximity with the composite ball joint bearing 20. In the illustrated embodiment, two of such electromagnets 80 are provided having a preselected size and are preferably secured to the housing 12 in a predetermined location for a purpose to be discussed below. Alternatively, the ball joint assembly 10 can include only one or more than two electromagnets 80 and/or the location of the electro-magnet(s) 80 can be other than illustrated if so desired.

Figure 3:
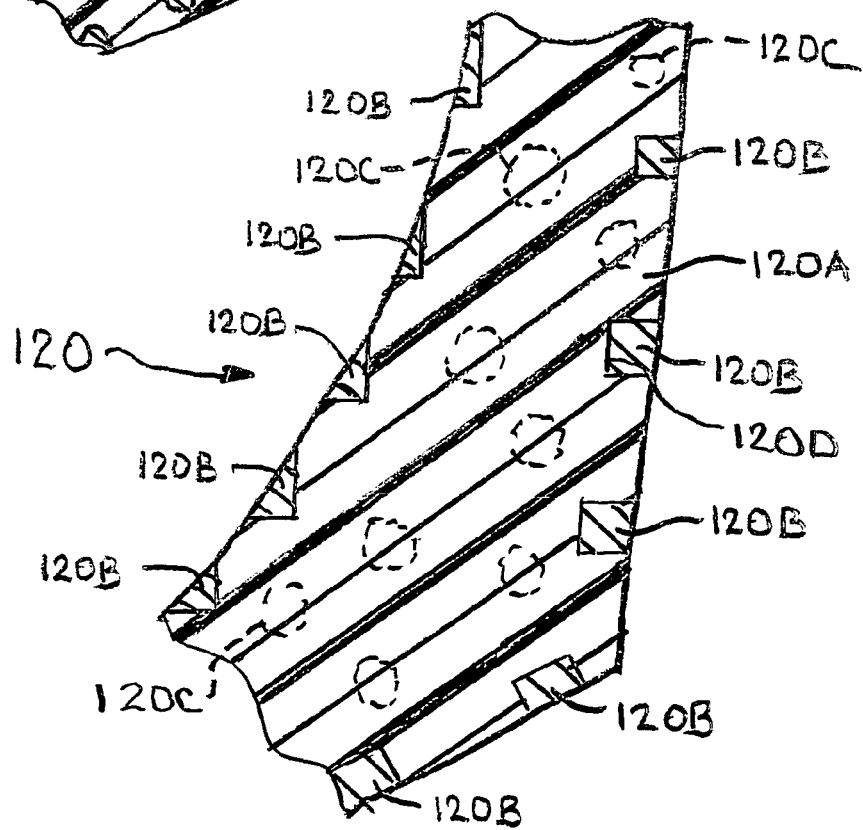
FIG. 3 is an enlarged sectional view similar to FIG. 2 of a second embodiment of a composite ball joint bearing in accordance with the present invention.

Turning now to FIG. 3, there is illustrated a second embodiment of a portion of a composite ball joint bearing, indicated generally at 120, in accordance with this invention. As shown therein, the composite ball joint bearing 120 is formed from a mixture or combination of a first material 120A and a second material 120B. In terms of the total weight of the bearing 120, the first material 120A is the primary material of the composite ball joint bearing 120 and is effective to define a main body portion of the 120 and the second material 120B is the secondary material of the ball joint bearing 120 and is added to the first material 120A for a purpose to be discussed below.

The first material 120A of the ball joint bearing 20 is made from a suitable material which preferably can be molded. For example, the first material 120A of the ball joint bearing 120 can be made of injection molded Delrin brand plastic which is available from E. I. DuPont de Nemours & Co. The second material 120B of the ball joint bearing 120 is made from a suitable magnetostrictive alloy material that changes its shape when in the presence of a magnetic field. An example such a suitable material is Terfenol-D® which is available from ETREMA Products, Inc., of Ames, Iowa. Alternatively, one or both of the first and second materials can be other than illustrated if so desired.

As shown in this embodiment, the second material 120B is preferably preformed and placed in a suitable mold (not shown) and integrally molded with the first material 120A during a suitable molding process, such as for example during an injection molding process. To accomplish this, the second material 120B has a predetermined shape and size and can be selectively positioned in the mold in a predetermined pattern or arrangement. Alternatively, the shape, size and/or the location of the second material 120B can be other than illustrated if so desired. For example, the second material 120B can be positioned to be completely embedded or surrounded by the first material 120A if so desired. Also, as shown in FIG. 3, the composite ball joint bearing 120 can also include parts of the second material, shown in phantom at 120C which are in powder form and added to the first material 120A as described above in connection with the first embodiment of the composite ball joint bearing 20 if so desired. In addition, instead of the second material 120B being integrally molded with the first material 120A during the molding process, the first material 12A can be molded and the second material 120B can be affixed or joined to the molded first material 120A of the bearing subsequent to the molding thereof. For example, the first material 120A can be molded or machined to include one or more cavities or recesses, such as shown at 120D, for receiving portions of the second material 120B therein. In this case, the second material 120B, which can be in either in a solid or a powder form, can be secured in the cavities 120D by a suitable process, such as by using an adhesive.

Figure 4:
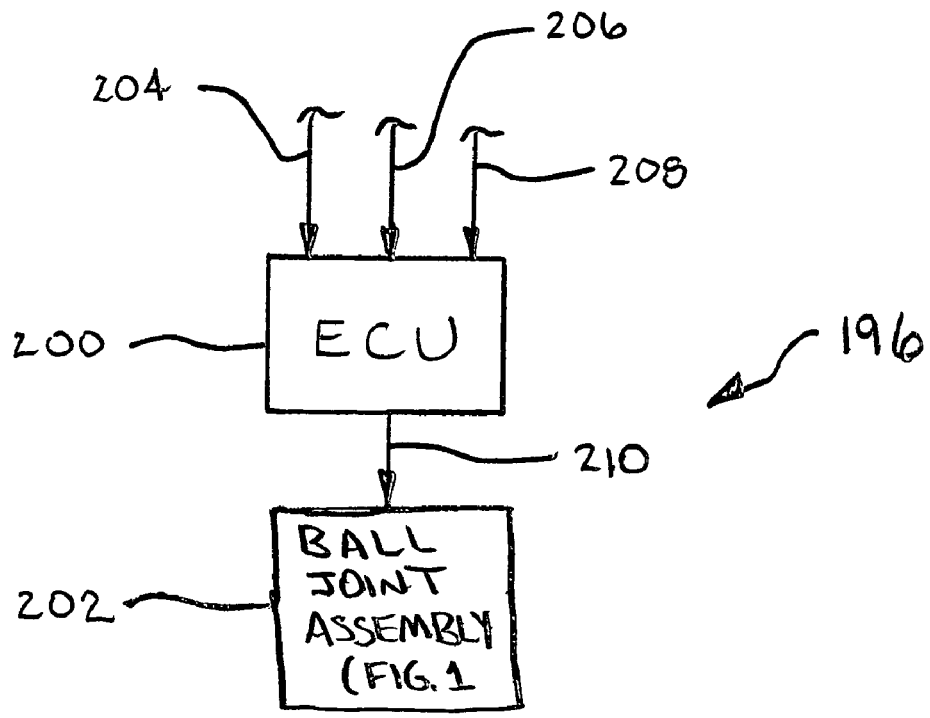
FIG. 4 is a schematic diagram of a first embodiment of a vehicle control system unit that can be used in conjunction with the present invention to control selected components of the vehicle.

Turning now to FIG. 4, there is illustrated a schematic diagram of a first embodiment of an electronic control system, indicated generally at 196, which can be used in conjunction with the ball joint assembly 10 of this invention. As shown therein, the electronic control system 198 includes a electronic control unit 200 and the ball joint assembly 202. The electronic control unit 200 is adapted to receive one or more input signals from selected vehicle components and is operative to generate one or more output signals to the electro-magnet 80 of the ball joint assembly 202. In the illustrated embodiment, the electronic control unit 200 receives three input signals 204, 206 and 208 and generates one output signal 210. The input signals can be from any desired vehicle components, such as for example, from a steering rate sensor 204, yaw rate sensor 206 and a vehicle acceleration sensor 208. Using these input signals 204, 206 and 208 the electronic control unit 200 determines an output signal 210 to be generated to the electro-magnet 80 of the ball joint assembly 10. The output signal 210 is in the form of an electric current applied to the electromagnet 80. The electric current 210 applied to the electro-magnet 80 is selectively controlled by the electronic control unit 200 to control the amount or degree of change in the shape of the composite ball joint bearing 20 that is to occur. As a result of this change of the shape of the bearing 20, the rotational and pivotal or oscillational torque properties of the ball stud 24 within the bearing 20 can be selectively controlled to meet predetermined steering and suspension characteristics to provide active control of the ball joint assembly 10. Alternatively, the number and/or the origination of the input signals 204, 206 and 208 and/or the number of the output signals 210 can be other than illustrated if so desired.

Figure 5:
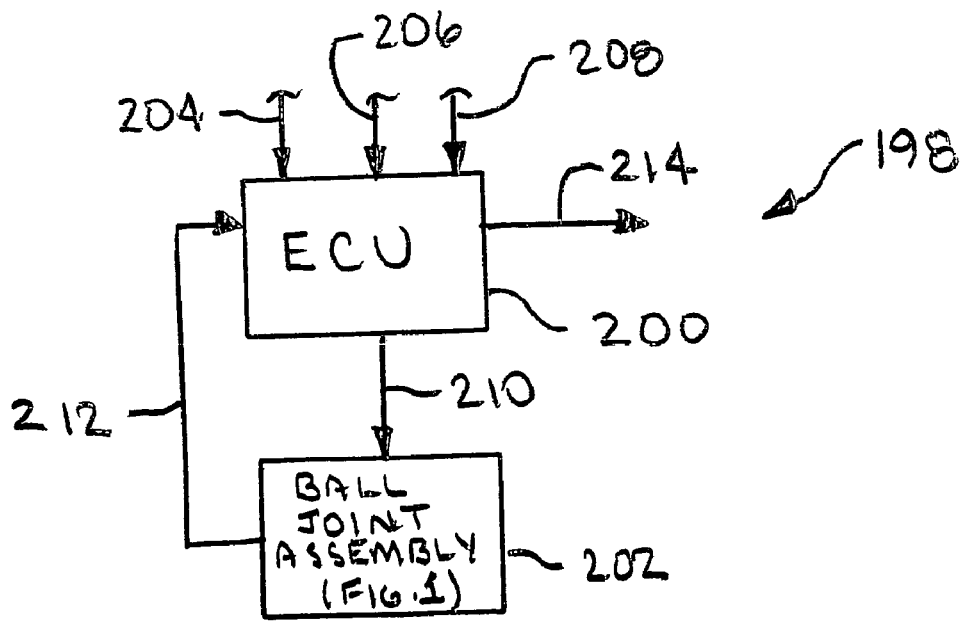
FIG. 5 is a schematic diagram of a second embodiment of a vehicle control system unit that can be used in conjunction with the present invention to control selected components of the vehicle.

Turning now to FIG. 5 and using like reference numbers to indicate corresponding elements, there is illustrated a schematic diagram of a second embodiment of an electronic control system, indicated generally at 198, which can be used in conjunction with the ball joint assembly 10 of this invention. As shown in this embodiment, the ball joint assembly 202 produces one or more output or feedback signals 212 which are supplied to the electronic control unit 200. The output signal 212 is determined by measuring the change in current flow due to the effects the magnetostrictive alloy material has on the magnetic field by load inputs from the suspension into the ball joint assembly 10. Using this output signal 212, the electronic control unit 200 determines and generates one or more output signals 214 which can be used to control desired adjustable rate suspension components, such as for example, springs, dampers and anti-sway bars to adjust them to obtain a desired vehicle behavior.

One advantage of the composite ball joint bearing of the present invention is that it allows the rotational and pivotal or oscillational torque properties of the ball stud within the bearing to be selectively controlled to meet predetermined steering and suspension characteristics to provide active control of the ball joint assembly. Also, the composite ball joint bearing of the present invention allows the ball joint torque to be controlled to provide steering feedback to the driver and to dampen brake or suspension oscillations. In addition, it could be used to prevent additional steering input in case of vehicle skidding to prevent the operator from over-correcting in the wrong direction. Also, the feedback signal from the ball joint could be used to determine loads coming into the suspension to help adjust spring rates for ride comfort; these loads could be used in conjunction with yaw sensors to determine spring rates and other adjustable suspension components to improve handling or adjust the suspension to prevent vehicle roll and or skidding and to detect wheel impacts which might cause steering wheel "kick-back" and try to prevent or reduce it.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A ball joint assembly adapted for use in a motor vehicle comprising:
   a housing defining a socket chamber and having an opening;
   a singular wholly solid composite ball joint bearing disposed within said socket chamber;
   a ball stud supported by said singular wholly solid composite ball joint bearing, said ball stud having a shank portion which projects through said opening of said housing and a single spherical ball portion supported for rotation and pivoting movement about a center of oscillation of said ball joint assembly; and
   a seal assembly adapted to seal said opening between said ball stud and said socket chamber;
   wherein said single spherical ball portion of said ball stud is solely supported by said singular wholly solid composite ball joint bearing within said chamber and wherein said singular wholly solid composite ball joint bearing consists of a combination of a first plastic material and a second magnetostrictive alloy material, wherein solid particles of said magnetostrictive alloy material are uniformly randomly dispersed within solid particles of said plastic materials, which is adapted to change its shape when in the presence of a magnetic field applied by an electro-magnet carried within said ball joint assembly to thereby change the rotational and oscillation properties of said ball joint assembly.

2. The ball joint assembly according to claim 1 wherein said first plastic material is molded during a molding process and said second magnetostrictive alloy material is integrally molded therewith during the molding process.

3. The ball joint assembly according to claim 1 wherein said first plastic material is molded during a molding process and said second magnetostrictive alloy material is joined to said molded first plastic material subsequent to the molding process.

4. The ball joint assembly according to claim 1 wherein said singular wholly solid composite ball joint bearing is molded from a mixture of said first plastic material and said second magnetostrictive alloy material, wherein said second magnetostrictive alloy material is in a powder form.

5. The ball joint assembly according to claim 1 wherein said singular wholly solid composite ball joint bearing is molded from a mixture of said first plastic material and said second magnetostrictive alloy material, wherein said second magnetostrictive alloy material is in a non-powder form.

6. The ball joint assembly according to claim 1 wherein said at least one electro-magnet is carried by said housing.

7. The ball joint assembly according to claim 6 further including an electronic control unit operatively connected to said ball joint assembly, said electronic control unit receiving at least one input signal from at least one component of the vehicle and generating at least one output signal in the form of an electric current to said electro-magnet.

8. The ball joint assembly according to claim 7 wherein said electronic control unit receives at least one input signal from one of the group consisting of a steering rate sensor, a yaw rate sensor, and a vehicle acceleration sensor.

9. The ball joint assembly according to claim 1 further including at least one electro-magnet carried by said housing and an electronic control unit operatively connected to said ball joint assembly, said electronic control unit receiving at least one input signal from said ball joint assembly and generating at least one output signal in the form of an electric current to control at least one adjustable rate suspension component of the vehicle.

10. The ball joint assembly according to claim 1 further including at least one electro-magnet carried by said housing and an electronic control unit operatively connected to said ball joint assembly, said electronic control unit receiving at least one first input signal from at least one component of the vehicle and at least one second input signal from said ball joint assembly, and generating at least one first output signal in the form of an electric current to said electro-magnet and at least one second output signal in the form of an electric current to control at least one adjustable rate suspension component of the vehicle.

11. A ball joint assembly adapted for use in a motor vehicle comprising:
a housing defining a socket chamber and having an opening;
a singular wholly solid composite ball joint bearing disposed within said socket chamber;
a ball stud supported by said singular wholly solid composite ball joint bearing, said ball stud having a shank portion which projects through said opening of said housing and a single spherical ball portion supported for rotation and pivoting movement about a center of oscillation of said ball joint assembly;
a seal assembly adapted to seal said opening between said ball stud and said socket chamber; and
at least one electro-magnet carried by said housing;
wherein said single spherical ball portion of said ball stud is solely supported by said singular wholly solid composite ball joint bearing within said chamber and wherein said singular wholly solid composite ball joint bearing consist of a combination molded from a first plastic material and a second magnetostrictive alloy material, wherein solid particles of said magnetostrictive alloy materials are uniformly randomly dispersed within solid particles of said plastic material, which is adapted to change its shape when an electric current is applied to said electro-magnet to thereby change the rotational and oscillation properties of said ball joint assembly.

12. The ball joint assembly according to claim 11 wherein said second magnetostrictive alloy material is in a powder form.

13. The ball joint assembly according to claim 11 wherein said second magnetostrictive alloy material is in a non-powder form.

14. The ball joint assembly according to claim 11 further including an electronic control unit operatively connected to said ball joint assembly, said electronic control unit receiving at least one input signal from at least one component of the vehicle and generating at least one output signal in the form of an electric current to said electro-magnet.

15. The ball joint assembly according to claim 14 wherein said electronic control unit receives at least one input signal from one of the group consisting of a steering rate sensor, a yaw rate sensor, and a vehicle acceleration sensor.

16. The ball joint assembly according to claim 11 further including an electronic control unit operatively connected to said ball joint assembly, said electronic control unit receiving at least one input signal from said ball joint assembly and generating at least one output signal in the form of an electric current to control at least one adjustable rate suspension component of the vehicle.

17. The ball joint assembly according to claim 11 further including an electronic control unit operatively connected to said ball joint assembly, said electronic control unit receiving at least one first input signal from at least one component of the vehicle and at least one second input signal from said ball joint assembly, and generating at least one first output signal in the form of an electric current to said electro-magnet and at least one second output signal in the form of an electric current to control at least one adjustable rate suspension component of the vehicle.

18. A ball joint assembly adapted for use in a motor vehicle comprising:
a housing defining a socket chamber and having an opening;
a singular wholly solid composite ball joint bearing disposed within said socket chamber;
a ball stud supported by said singular wholly solid composite ball joint bearing, said ball stud having a shank portion which projects through said opening of said housing and a single spherical ball portion supported for rotation and pivoting movement about a center of oscillation of said ball joint assembly; and
at least one electro-magnet is carried by said housing;
wherein said single spherical ball portion of said ball stud is solely supported by said singular wholly solid composite ball joint bearing within said chamber and wherein said singular wholly solid composite ball joint bearing is a one-piece integrally molded composite ball joint bearing formed from a first plastic material and a second magnetostrictive alloy material, where solid particles of said magnetostrictive alloy material are uniformly randomly dispersed within solid particles of said plastic material, which is adapted to change its shape when in the presence of a magnetic field applied by said electro-magnet to thereby change the rotational and oscillation properties of said ball joint assembly.

* * * * *